June 2, 1925.  1,540,656
A. B. SEPPMANN
POWER CRANKING DEVICE FOR FORDSON TRACTORS
Filed April 23, 1923
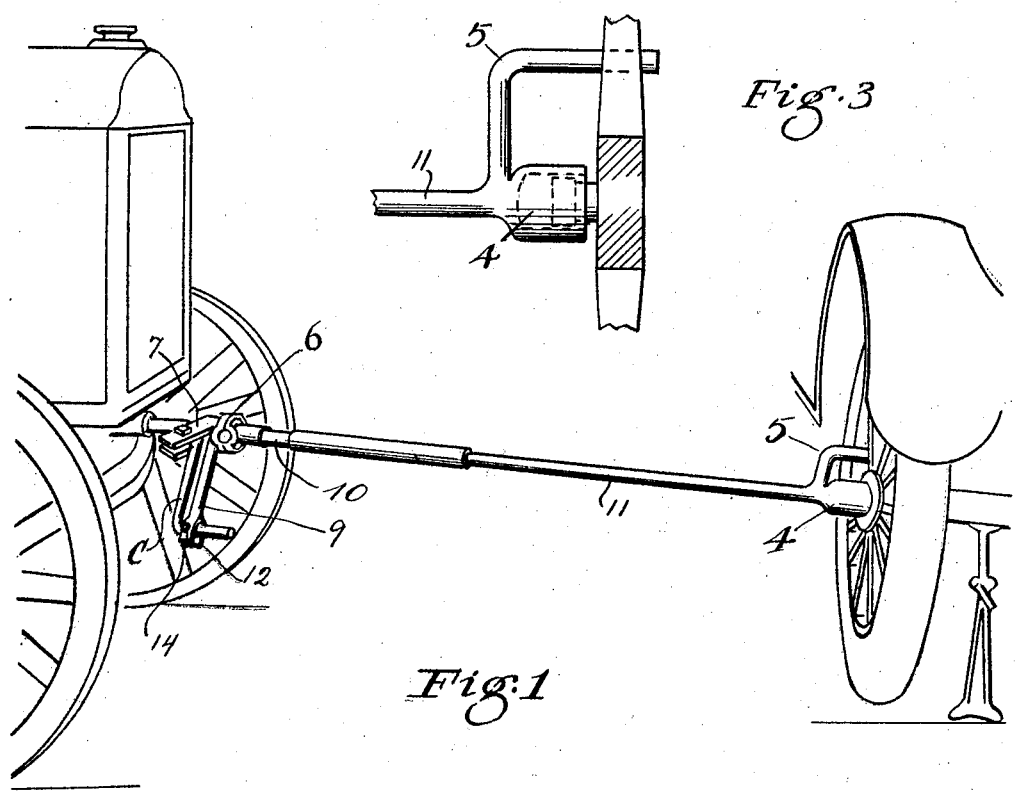
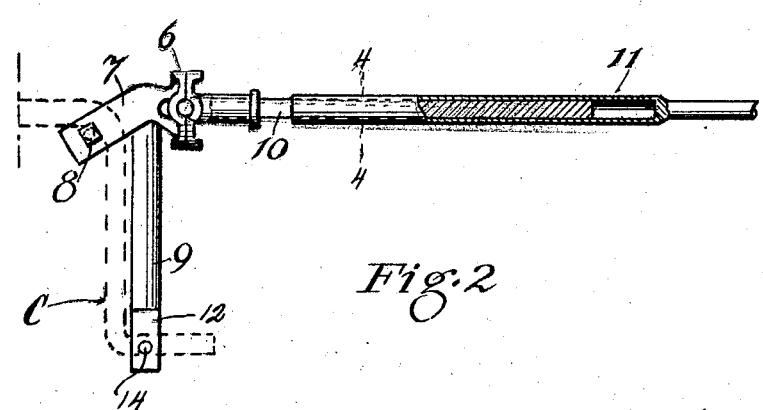
Inventor
A.B.Seppmann
By Watson E. Coleman
Attorney Patented June 2, 1925.

1,540,656

UNITED STATES PATENT OFFICE.

ALFRED BRUNO SEPPMANN, OF LAKE CRYSTAL, MINNESOTA.

POWER CRANKING DEVICE FOR FORDSON TRACTORS.

Application filed April 23, 1923. Serial No. 634,039.

*To all whom it may concern:*

Be it known that I, ALFRED BRUNO SEPPMANN, a citizen of the United States, residing at Lake Crystal, in the county of Blue Earth and State of Minnesota, have invented certain new and useful Improvements in Power Cranking Devices for Fordson Tractors, of which the following is a specification, reference being had to the accompanying drawings.

This invention relates to certain improvements in power cranking devices and has relation more particularly to a device of this general character especially designed and adapted for use in connection with a Fordson tractor and it is an object of the invention to provide a device of this character having novel and improved means whereby the same may be readily and conveniently coupled to the crank of the tractor and to a driving wheel of an automobile.

The invention consists in the details of construction and in the combination and arrangement of the several parts of my improved power cranking device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a power cranking device constructed in accordance with an embodiment of my invention and in applied position;

Figure 2 is a fragmentary view partly in section and partly in elevation of my improved device as herein disclosed, a coacting crank being indicated by broken lines;

Figure 3 is a fragmentary view partly in section and partly in elevation illustrating the wheel engaging end portion of my improved device;

Figure 4 is a sectional view taken substantially on the line 4—4 of Figure 2;

As disclosed in the accompanying drawings, my improved cranking device comprises two elongated members 10 and 11 one telescopically engaged within the other but rotating one with the other. The outer end portion of the member 11 is provided with a socket or cup member 4 which is adapted to be slipped or engaged over a hub cap of a rear or driven wheel of an automobile such as the well known Ford type. The socket or cup member 4 is machined out smooth and slightly tapered and is large enough to permit the outer end portion of the member 11 to angle a considerable distance without any injury to the hub cap. The socket or cup member 4 also serves to maintain the shafting in proper alignment with the hub.

The member 11 at a point inwardly of but in close proximity to the socket or cup member 4 is provided with a branch crank 5 which is adapted to extend between adjacent spokes of the wheel and provides effective means whereby the member 11 is caused to rotate with the wheel. The branch crank 5 is substantially L-shaped in form with its foot preferably formed with the member 11 while the stem of the crank extends outwardly a distance beyond the socket or cup member 4 to effect proper engagement between adjacent spokes of the wheel.

The outer end portion of the member 10 is connected as at 6 by an ordinary universal joint with the crank engaging members 7 and 9. The engaging members 7 are arranged in pairs and receive therebetween the inner bend of the tractor crank C as is believed to be clearly illustrated in Figures 1 and 2, said members 7 after being applied being connected outwardly of the crank C by a bolt 8 or the like whereby the members 7 are prevented from becoming disengaged from the crank. The engaging member 9 has its outer end portion forked as at 12 to straddle the outer or second angle of the crank C and disposed through each of the arms of the fork 12 is a binding or set screw 14 for engagement with the crank and to maintain the member 9 effectively engaged therewith.

As is clearly illustrated in the accompanying drawings, the crank 5 is arranged entirely to one side of the member 11 and radially thereto, the stem of the crank being substantially in parallelism with the member 11.

In practice the power driven vehicle is positioned in front of and within proper range of the tractor and a rear wheel of the vehicle is lifted up by a jack or the like and the member 11 operatively engaged as hereinbefore described with said lifted wheel. The member 10 is engaged as hereinbefore described with the crank C. Upon starting the motor of the vehicle the rotation of the wheel will result in the proper rotation of the crank C and the desired starting of the motor of the tractor. By having the members 10 and 11 telescopically engaged, the device in its entirety may be readily and conveniently applied.

The joint 6 is used to permit desired angle positioning of the device and especially in such cases where the alignment of the motor vehicle and the tractor is not perfectly set.

It is well known that various difficulties are encountered in cranking Fordson tractors and other tractors of like construction. In cold weather, when heavy oil is used and especially late in the season, at times it is practically impossible to crank the tractor by hand power. In this event it is usually necessary to call an assistant resulting in considerable expense and loss of time. When it becomes necessary for overhauling a Fordson tractor or the like in the field in doing such work as replacing connecting rods or burnt out bearings, putting in new piston rings or any such work it is known that these parts, being new naturally fit snugly and have a tendency to drag on the crank shaft and it is difficult to start up said tractor the first time after such work is done. With my invention the foregoing difficulties are readily overcome.

From the foregoing description it is thought to be obvious that a power cranking device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A device of the class described comprising an elongated member, means carried by one end portion of the member for operatively connecting the same to the crank of a motor, the opposite end of the member being provided with a socket member to engage the hub cap of a driven wheel whereby said member and wheel will rotate in unison, and a branch crank integrally connected with said member inwardly of and in close proximity to the socket member, said branch crank being adapted to engage between adjacent spokes of the wheel, said branch crank being substantially L-shaped in form with its foot engaged with the member and its stem of a length to extend outwardly beyond the socket member, said branch crank being entirely to one side of the member and radially with respect thereto, the stem of the branch crank being substantially in parallelism with the member, said socket member being machined out smooth and slightly tapered.

In testimony whereof I hereunto affix my signature.

ALFRED BRUNO SEPPMANN.